Sept. 23, 1952 F. J. SOMERS 2,611,820

PICK-UP TUBE BEAM-INTERRUPTING CIRCUIT

Filed Feb. 18, 1947

INVENTOR.
FRANK J. SOMERS
BY W. S. Grover.
ATTORNEY

Patented Sept. 23, 1952 2,611,820

UNITED STATES PATENT OFFICE 2,611,820

PICKUP TUBE BEAM-INTERRUPTING CIRCUIT

Frank J. Somers, Rockville Centre, N. Y., assignor to Radio Corporation of America, a corporation of Delaware Application February 18, 1947, Serial No. 729,213

2 Claims. (Cl. 178—7.2)

Figures 1, 2:
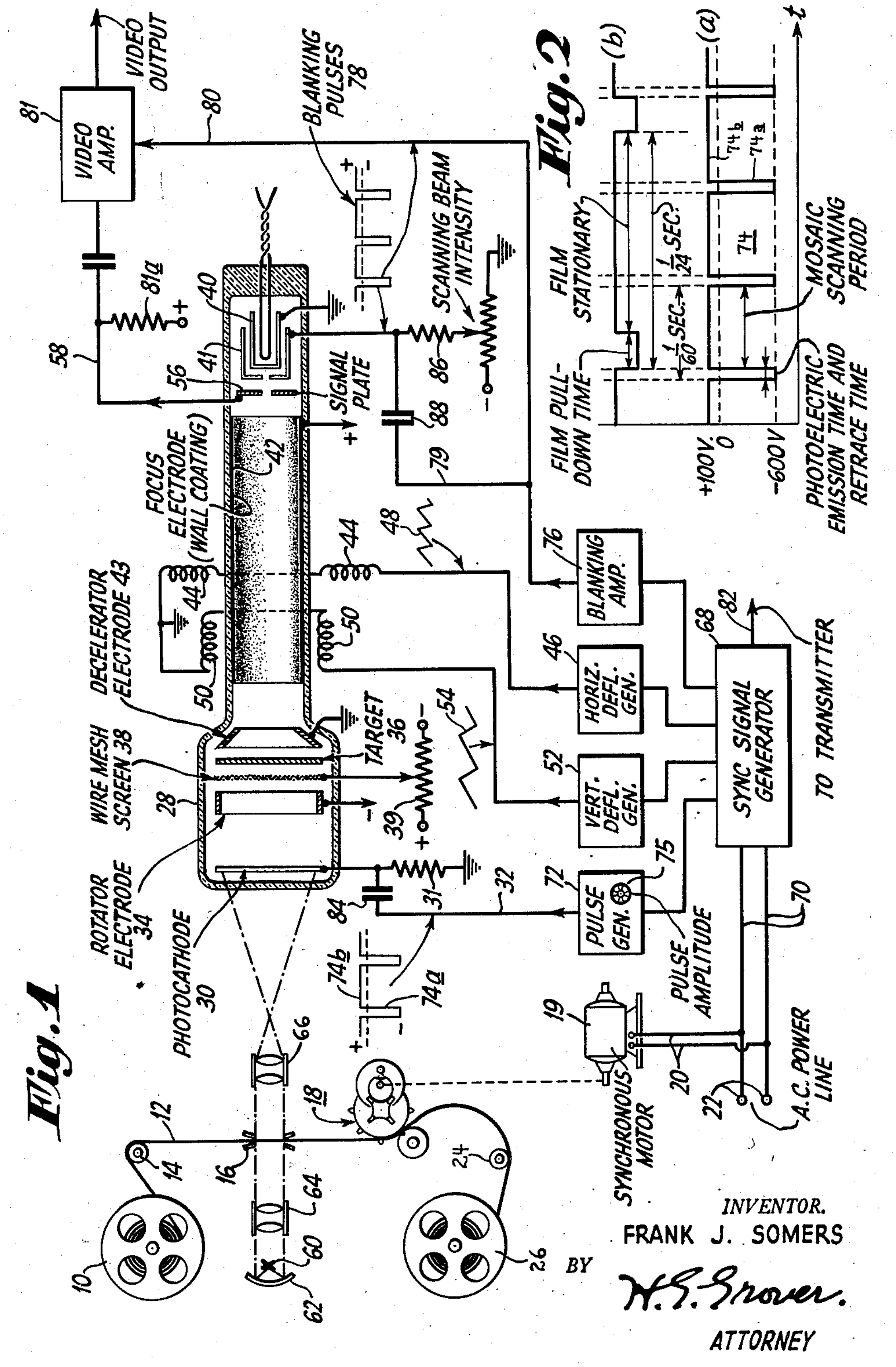

The present invention relates to television systems, and more particularly relates to a television transmitting system employing a storage-type camera tube having a so-called "image" section. In this form of camera tube, light from an optical image is caused to fall upon a photo-sensitive electrode in the camera tube thereby to cause photoelectric emission from the electrode surface. Such emission is in the form of an electron image corresponding point-for-point to the optical image.

The electron image thus released from the surface of the photo-sensitive electrode is drawn down the camera tube under the influence of an accelerating field and impinges on a mosaic electrode. This impingement of the electron image on the mosaic sets up on the latter an image in stored electrostatic charge, the value of this charge on each mosaic elemental area being dependent upon the brilliance of the corresponding point of the optical image.

The mosaic electrode is then scanned by a cathode ray scanning beam developed within the camera tube to produce output signals which modulate the carrier wave of the television transmitter. Under present United States standards for black-and-white television, 30 complete images, or frames, are transmitted each second, and since double interlaced scanning is customarily employed, two fields are transmitted for each frame, or 60 fields per second.

When it is desired to utilize a system including an "image" type camera tube of the above nature in connection with the televising of images recorded on motion picture film, certain factors must be taken into consideration. One of these factors results from the difference between the presently standard black-and-white television field frequency of 60 per second (30 frames double interlaced) and the standard motion picture projection frequency of 24 film frames per second, and various arrangements have been devised to correlate these operating frequencies so that the apparent movement of the film subject matter is not unnaturally accelerated. One such method resides in the use of an intermittent projector in which alternate film frames supply two television images for two successive television fields, while the remaining film frames supply three television images for three television fields. One example of such a system is disclosed in United States Patent No. 2,082,092, issued June 1, 1937, to A. V. Bedford.

In a further United States Patent No. 2,303,960, issued December 1, 1942, to S. W. Seeley, there is disclosed a motion picture projector for television use in which a regular intermittent motion is imparted to the film, and a disc shutter employed which is rotated at a speed which will result in the projection of 60 light images per second on the light-responsive electrode of the camera tube, the shutter opening being so dimensioned that the light images are actually projected on the light-responsive electrode of the camera tube for only the time period between each successive transmission of the separate television fields—that is, between each successive scanning operation. In an arrangement of this nature, the light-responsive electrode of the camera tube is scanned by the cathode ray scanning beam in substantially complete darkness, this scanning operation acting to produce video output signals from the camera tube by removing, by neutralizing, or otherwise, the charge image. The next succeeding charge image is then produced by the projection of a film image on the light-responsive electrode during the time that the cathode ray scanning beam is returned to its starting position in preparation for another field-scanning cycle.

In such operation, the use of a disc shutter, or other means for cutting off light from the camera tube during the field-scanning operation, is essential. Furthermore, this shutter must be accurately speed controlled so as to maintain the intermittent movement of the film in pre-established relationship relative to the beam deflection generators associated with the camera tube.

According to one feature of the present invention, means are provided whereby the rotating disc shutter normally used in film projection television systems of the nature described above may be dispensed with. Furthermore, an overall simplification of the transmitting system is achieved, since no moving parts need be utilized to supplement the standard projector unit. Briefly, this result is accomplished by applying to the photo-sensitive electrode of the camera tube a potential which has alternate periods of positive and negative polarity, and by controlling the application of this potential so that its positive periods coincide in time with the periods during which the mosaic electrode of the camera tube is being scanned by the cathode ray scanning beam. Such a positive potential on the photo-sensitive electrode of the camera tube is effective during the periods of its application to prevent the release of photo-electrons from the photo-sensitive electrode to the mosaic. It thus has the same effect as if no light were reaching the photo-sensitive electrode. Actually, however, such a prevention of photoelectric emission during the scanning intervals, in accordance with applicant's disclosure, is not dependent upon the presence, or absence, of light impinging the photocathode.

The negative periods of the potential applied to the photo-sensitive electrode of the camera tube occur respectively during all or a portion of the retrace, or snap-back, periods of the cathode ray scanning beam, and permit photoelectric emission from this electrode during these negative periods. Hence, the charge image on the mosaic is established, or built up, during retrace time, and in order to prevent image distortion, the cathode ray scanning beam is cut off, or blanked, during such retrace periods.

By a proper choice and selection of the time when positive voltage pulses applied to the photo-sensitive electrode of the camera tube with respect to the time when the intermittent movement of the motion picture film occurs, the film movement may be made to occur during the field-scanning periods of the cathode ray beam. Since no photoelectric emission occurs during these scanning intervals, the film movement will not adversely affect the charge images developed on the camera tube mosaic. Furthermore, the 1:2½ ratio between film movement and television field frequency, as set forth in the above-mentioned Seeley patent, may be retained.

The present invention may also be utilized in connection with so-called field pickups to effectively "stop" fast-moving objects by applying to the camera tube photo-sensitive electrode a potential having very short negative periods, say in the order of $\frac{1}{1000}$ second. As a result, photoelectric emission would occur only during these relatively short intervals, and blurring of the reproduced image would be eliminated. The scanning periods in such a case could retain their normal duration or could be lengthened, as desired.

One object of the present invention, therefore, is to provide a television transmitting system utilizing a camera tube having a separate photo-sensitive electrode, and to provide a method and means whereby the photoelectric emission from this electrode may be conveniently controlled.

Another object of the invention is to provide, in a television transmitting system of the type in which optical images are projected from a motion picture film or other recording medium on to the separate photo-sensitive electrode of a camera tube, means whereby the usual disc shutter, or other means for cutting off the light from the surface of the photo-sensitive electrode, may be dispensed with.

A still further object of the invention is to provide a television transmitting system in which a camera tube may be so controlled as to "stop" fast-moving objects, and in which this controlling means utilizes no moving parts.

Other objects and advantages will be apparent from the following description of a preferred form of the invention and from the drawing, in which:

Fig. 1 is a schematic representation of a preferred form of the present invention as applied to a television transmitting system in which the images to be televised are recorded on motion picture film; and Fig. 2 is a chart illustrating various time relations present in the circuit of Fig. 1.

Referring first to Fig. 1, there is shown a supply reel 10 from which the film to be shown by television is withdrawn. The film 12 is passed over an idler roller 14 and then through a film gate 16. The film 12 is drawn through the gate 16 in an intermittent manner by means of a suitable form of film drive mechanism 18 which may, for example, be of the type shown in United States Patent No. 2,251,786, granted August 5, 1941, to D. W. Epstein. The intermittent film advance mechanism 18 hence will not be described in detail, and it will merely be stated that the mechanism 18 is one of any suitable form which acts to pull the film 12 through the gate 16 at the rate of 24 film frames per second when driven by a synchronous motor 19. The latter is energized over conductors 20 from the A.-C. power line input terminals 22. The film then proceeds over an additional idler roller 24 and is wound up on the take-up reel 26.

Fig. 1 also shows a television pickup or camera tube 28, which may be of the type known as the "Image Orthicon." A tube of this general nature is set forth in an article entitled "The Image Orthicon—A Sensitive Television Pickup Tube," by Albert Rose, Paul K. Weimer, and Harold B. Law, which appeared on pages 424–432, inclusive, of the July 1946 issue of the "Proceedings of the Institute of Radio Engineers." However, other type tubes having an "image" section may, if desired, be utilized in place thereof.

Camera tube 28 includes a light-responsive electrode, or photo-cathode 30, which is preferably of the laterally conducting semi-transparent character set forth in the above-mentioned Rose et al. article. Photo-cathode 30 is connected to ground or to a point of constant potential through a resistor 31.

In accordance with the present invention, potentials of alternate positive and negative polarity are applied to the photo-cathode 30 over a conductor 32. Such operation will later be described in detail, but for the present it will be assumed that the photo-cathode 30 is at a negative potential with respect to ground. Under this condition, illumination falling on the translucent photo-cathode 30 causes an emission of electrons from the inner surface thereof, such emission, as is well known in the art, being in the form of an electron image each point of which corresponds in density to the strength of the illumination on the corresponding point of photo-cathode 30.

Electrons thus emitted from the surface of photo-cathode 30 are accelerated by a "rotator" electrode 34, which is connected to a source of relatively low negative potential, toward a mosaic, or target, electrode element 36 which is at positive potential with respect to the photo-cathode 30. This mosaic element 36 is preferably composed of a thin sheet of low-resistivity glass, but it may, if desired, be constructed of semi-conducting material as set forth in the U. S. Patent No. 2,403,239 issued to A. Rose on July 2, 1946, Serial No. 407,132, filed August 16, 1941, and/or the U. S. Patent 2,506,741 issued to A. Rose on May 9, 1950, Serial No. 631,441, filed November 28, 1945. A suitable electron lens (not shown) which may be of the character disclosed, for instance, in the mentioned Rose et al. article is employed to focus on the mosaic electrode 36 the electrons emitted from the surface of photo-cathode 30.

Electrons released from the photo-cathode 30 which are moved in the direction of the mosaic so as to impact the mosaic 36 cause, in turn, secondary electrons to be released from the compacted surface with the number of secondary electrons released by each arriving primary electron being governed by numerous factors, including the velocity of the primary electron at the moment of impact, the character of the surface impacted and so on. Such velocity is determined principally by the accelerating potentials applied to the photo-electrons, and these potentials are preferably chosen so that more than one secondary electron is released from the surface of the mosaic electrode 36 for each impacting primary electron, or, in other words, the secondary emission ratio is greater than unity.

The secondary electrons released from the mosaic, or target, electrode 36 are collected by a wire mesh screen 38. This screen 38 is normally operated at a relatively low positive potential with respect to ground, as determined by the adjustment of a potentiometer 39. The release of secondary electrons by a particular element of the mosaic 36 leaves such element with a positive charge, or, in other words, with a negative charge deficiency. The amount of such actual deficiency is dependent upon the density of the electron image at that particular point.

The positively charged mosaic 36 is then scanned by means of an electron beam produced by an electron gun at the opposite end of tube 28, this electron gun being of any suitable type which includes a cathode 40 and a grid 41 and an accelerating anode element. It is, therefore, illustrated more or less schematically because of detailed existing description in the literature. It will be further understood that an electron multiplier structure, such as shown, for example, in the mentioned Rose et al. article, may be incorporated in the camera tube 28 to amplify the signal energy available at the signal plate. Such a multiplier structure has not been shown, however, in order to simplify the drawing.

The camera tube 28 also includes a focus electrode 42, which may be a conducting coating on the wall of the tube, and a so-called decelerating ring, or electrode, 43 which is positioned in the region of the target 36. The focus electrode 42 has applied to it a potential of positive polarity relative to ground, while the decelerator ring 43, on the other hand, is grounded in order to decelerate the scanning beam electrons to approximately zero velocity in the region of the mosaic electrode 36.

Camera tube 28 also includes means for deflecting the electron beam composed of the electrons emitted from the cathode 40 so that this beam will scan the mosaic electrode 36. Such deflecting means includes a pair of horizontal, or scanning line frequency deflection coils 44 connected to a horizontal deflection generator 46. The output of the generator 46 is preferably a sawtooth current wave, such as indicated at 48, and which varies at horizontal, or line-scanning, frequency. Also provided is a pair of vertical, or field frequency beam deflection coils 50 connected to a vertical deflection generator 52, the output of the latter being a sawtooth current wave 54 varying at vertical, or field-scanning, frequency. However, it will be understood that electrostatic deflecting means may be employed for deflecting the cathode ray scanning beam of the camera tube 28 instead of the electromagnetic deflecting means illustrated and described. Also, various combinations of these two means may be used, if desired.

As the scanning beam travels across the surface of the mosaic electrode 36, electrons from the beam neutralize the positively charged mosaic elements. The beam normally supplies sufficient electrons to make up the negative charge deficiency of each image element. If a particular element is not positively charged, or if such positive charge is small enough so that all of the electrons available in the scanning beam during the instant of passage should not be required to make up the negative charge deficiency on that element, then the remaining electrons in the beam, or, in other words, those not required to neutralize the electrostatic charge representing each image element or point, are caused to return along a path substantially parallel with the scanning beam toward the end of tube 28 containing the electron-emitting cathode 40. Upon arriving at this end of tube 28, the returned electrons are collected by a signal plate 56 forming a part of the tube output circuit 58. The signal plate 56 may be of any suitable design, such, for example, as a circular disc having a small central aperture through which the scanning beam electrons produced by the cathode 40 may pass.

For projecting optical images from the motion picture film frames on to the photo-cathode 30 of tube 28, a source of light 60 is provided with which is associated a reflector 62. Light from the source 60 is directed upon that portion of the film 12 which is present in the film gate 16 by means of a condensing lens 64. The light which is permitted to pass through the film is focussed upon the light-responsive electrode, or photo-cathode, 30 by means of the projection of focussing lens systems 66.

Since the television field scannings of the mosaic electrode 36 are at the rate of 60 per second, electrostatic charge images are developed on the mosaic also at the rate of 60 images per second during the time period between successive transmissions of the separate television fields—that is, between each successive field-scanning operation. In Fig. 2*a* is shown a representation of several television fields. These fields are indicated as a function of time, and, as represented in the drawing, each field cycle occupies $\frac{1}{60}$ second. Of this cycle, not over 10%, or $\frac{1}{600}$ second, is normally utilized for the vertical return of the cathode ray scanning beam. This return period may coincide in duration, as well as occurrence, with the time that the electrostatic charge image representative of an optical image on the film 12 is developed on the mosaic electrode 36, or in other words, with the photoelectric emission time of photo-cathode 30. Between each such photoelectric emission time is a period normally of at least $\frac{9}{600}$ second which is actually the useful field-scanning time of the mosaic electrode 36.

Fig. 2*b* is related to Fig. 2*a*, and shows the movement which may be imparted to the film 12 in order that 60 television fields may be transmitted from a film operating at 24 frames per second. One film frame cycle, as shown, occupies a time period of $\frac{1}{24}$ second, the film being moved during a portion of this cycle which may correspond approximately to $\frac{1}{150}$ second. For a more detailed description of the relationship between the film movement and the scanning operation of the camera tube 28, reference is made to the above-mentioned Seeley patent.

Since a charge image is developed on the mosaic electrode 36 during the photoelectric emission time of the photo-cathode 30, and since the latter coincides in occurrence with the retrace periods of the cathode ray scanning beam, a properly established relationship must exist between the motion of the film 12 and the scanning operation of the camera tube 28. This is necessary in order that the movement of the film 12 through the gate 16 occurs during the mosaic scanning periods, or, in other words, when no charge image is being developed on the mosaic 36. This is also illustrated by the graphs *a* and *b* of Fig. 2.

To obtain this relationship between film movement and scanning operation, the synchronizing (or "sync") signal generator 68 is provided. The operation of generator 68 is synchronized with the operation of the motor 19 by means of connections 70 between the generator and the A.-C. power line input terminals 22 which supply power to the motor 19 over the conductors 20, as previously described. The sync generator 68 is designed to supply impulses at the rate of 60 per second which are fed to the 60 cycle vertical, or field, deflection generator 52, the latter operating through the deflecting coils 50 to cause the cathode ray scanning beam of tube 28 to be deflected vertically at the rate of 60 deflections per second. The sync generator 68 also supplies impulses at line frequency which are fed to the horizontal, or line, deflection generator 46, the latter operating through the deflecting coils 44 to cause the cathode ray scanning beam to scan each line of the mosaic electrode 36. As a result, a movement of the film 12 by the synchronous motor 19 acting through suitable gearing (where necessary) and the intermittent mechanism 18 is related to the horizontal and vertical deflection of the cathode ray scanning beam of the camera tube 28, and the pull-down times of the film 12, as represented in graph *b* of Fig. 2, will occur during the mosaic scanning periods (as shown in graph *a* of Fig. 2) when no photoelectric emission occurs from the photo-cathode 30. The means for preventing photoelectric emission from the photocathode 30 during the scanning intervals, and for permitting such photoelectric emission between each scanning period, will now be described.

It has been customary in television systems of the type in which optical images are projected from a moving picture film or other recording medium on to the light-responsive electrode of a camera tube to employ some means in the optical path for intermittently cutting off the light from the photo-sensitive electrode during the cathode ray beam scanning periods. This means usually took the form of a disc shutter such as shown, for example, in the above-mentioned Seeley patent, or in the U. S. Patent No. 2,455,323, issued on November 13, 1948 to Charles L. Townsend, Serial No. 678,547, filed June 22, 1946. In such arrangements, the operation of the disc shutter was related both to the intermittent movement of the motion picture film and also with the scanning operation of the camera tube. This might be accomplished, for example, by connecting a disc shutter so that it may be driven by the same synchronous motor which affects the movement of the motion picture film.

In accordance with one feature of the present invention, this disc shutter may be entirely eliminated, and light may be permitted to fall upon the photo-cathode 30 at all times during operation of the system, including the intervals during which the film 12 is being moved through the gate 16. Such a mode of operation is permissible if some means are provided for preventing photoelectric emission from the photo-cathode 30 even though light is being received on the surface thereof. A preferred method of thus preventing photoelectric emission at desired intervals such, for example, as during the scanning periods of the mosaic electrode 36, is by applying to the photo-cathode 30 a potential which is of positive polarity relative to ground during such periods, and is of such magnitude as to preclude the effective emission of electrons from the inner surface of the electrode.

For the above purposes, there is provided a pulse generator 72 the operation of which is synchronized from the sync generator 68 as shown. The output of the pulse generator 72 is a series of substantially rectangular voltage pulses which may, for example, have a waveform such as generally indicated by the reference character 74 (see Fig. 2*a*). The pulses 74 have relatively narrow portions 74*a* which coincide in time with the retrace periods of the cathode ray scanning beam of the camera tube 28, and which, in one modification, have the same time duration as these retrace periods. The rectangular pulses 74 also have positive portions, indicated in the drawing by the reference character 74*b*, which coincide in time with the field-scanning periods of the cathode ray beam of tube 28. The amplitude of these positive pulses is such as effectively to prevent electrons released by photoelectric emission from the photo-cathode 30 from flowing to and reaching the mosaic 36 during the period of their application, and is controllable in any well-known manner, such, for example, as by means of a manually-actuatable knob 75 acting to control the output of generator 72. In "image" type camera tubes now generally in use, the amplitude of these positive pulses may have a value in the order of +100 volts relative to ground, for instance, (and bearing in mind that the decelerating electrode 43 is illustrated at ground potential by way of example) in order to completely stop effective photoelectric emission from the photo-cathode 30.

The negative portions 74*a* of the pulses 74, as above stated, occur during retrace time, and have an amplitude sufficient so that photoelectric emission from the photo-cathode 30 flows over to and impinges upon the mosaic 36. It has been found in practice that a negative voltage of −600 volts is sufficient so that an electrostatic charge image is developed on the mosaic 36 during the time that this negative voltage is applied to the photo-cathode 30.

Since the electrostatic charge image is developed on mosaic 36 during the retrace periods of the cathode ray scanning beam, it is necessary that the scanning beam be cut off, or blanked, during the development of the charge image, as otherwise partial neutralization of the mosaic elements will occur in such a manner as to cause distortion in the output of the camera tube. Accordingly, a blanking amplifier 76 is provided which is also synchronized from the sync generator 68. This blanking amplifier 76 produces negative blanking pulses, which may have a waveform such as indicated by the reference numeral 78, for application to the grid 41 of the camera tube 28 over a conductor 79 so as to bias the grid 41 negatively and cut off the electron scanning beam during retrace periods, or, in other words, during the periods of charge development on the mosaic 36. Such a cutting off of the electron scanning beam has the same effect, however, as a utilization of all of the scanning beam electrons to neutralize a positively charged mosaic. In other words, it is equivalent to a "white" signal output from tube 28 over conductor 58. In order that this "white" signal be prevented from modulating the television transmitter so as to transmit a "white" signal during the retrace periods of the cathode ray scanning beam, the blanking pulses 78 are also applied over a conductor 80 to a video amplifier 81 which receives the video output of camera tube 28 as developed on a load resistor 81*a*. These blanking pulses 78 act to cut off the signal output of amplifier 81 during retrace periods, this being accomplished in any well-known manner, as by a biasing of the grid or grids of the amplifier tubes.

A portion of the output of the sync generator 68 is applied to the television transmitter (not shown) over a conductor 82 so that synchronizing impulses may be transmitted along with the video output of the camera tube 28. These synchronizing impulses are generally transmitted both at the end of each line-scanning interval and at the end of each field-scanning interval—that is, during the horizontal and vertical retrace periods of the cathode ray scanning beam.

As previously brought out, applicant's invention is not restricted to use with a motion picture projector device, and such an apparatus has been shown in the drawing merely by way of illustration. For example, it is within the scope of the present invention to vary either or both the photoelectric emission time and the time in which the mosaic is scanned by the cathode ray beam. This may be particularly desirable in certain special applications of the invention. For example, if the camera tube is arranged to pick up a scene which has a low intensity of illumination and is located at a considerable distance from the tube, then the tube exposure time, or, in other words, the time during which the photo-cathode of the tube has applied to it a potential of negative polarity, may be considerably increased. This will result in a longer duration of the electron flow to the mosaic and permit the building up on the mosaic of the tube a stronger electrostatic charge image which would otherwise be of limited magnitude due to a short exposure period. The increased charge image when released will in turn be effective to produce greater signal output and have the effect of increasing the brightness of the image which is reproduced at the receiver. It will, of course, be realized that such an expedient is not usually practicable in cases where the scene which is picked up by the camera tube includes any appreciable motion, since the relatively longer exposure time in such a case tends to cause a pronounced loss of detail or a blur of the reproduced image.

It is also permissible in certain special applications of the invention to use an image-reproducing tube having a rather long luminous persistence screen or target area. The exposure time of the camera tube may then be reduced to a point where very fast motion in a particular scene may be effectively arrested or "stopped." In order to bring about such a relatively short tube exposure time, the negative portions 74*a* of the rectangular voltage wave 74 may be made very narrow. In this event, the normal mosaic scanning period may be lengthened by any amount up to that by which the normal photoelectric emission time is shortened, thereby permitting a greater number of lines to be transmitted during each field-scanning period. In order not to increase appreciably the required band width, the frame repetition frequency may be reduced. However, it will be appreciated that this procedure will increase the amount of flicker which is present in the reproduced image, even where image-reproducing tubes having long-persistence screens are employed, since a relatively long period of time exists between each mosaic exposure period. Nonetheless, such a mode of operation may be particularly suited for giving an instantaneous reading or indication of some particular characteristic of a very fast-moving object or in certain industrial uses, especially where the indication itself is of primary importance and the increased amount of flicker can be subordinated to the principal object of obtaining the reading or indication.

It should be understood, moreover, that applicant's invention is not limited to the particular time relationships indicated by way of example in Fig. 2, and that the invention is broadly applicable to any television transmitting system utilizing a camera tube having an "image" section for the purpose of preventing photoelectric emission between the photo-cathode and the mosaic electrode of the tube during the time that the latter is being scanned by the tube cathode ray scanning beam. This eliminates the necessity for cutting off light from the photo-cathode during such retrace periods and, consequently, does away with the necessity of employing specific apparatus for such a purpose. As applicant's system employed no moving parts, it follows that the usual construction and operation of such a television transmitter is simplified.

The values of resistor 31 and its associated condenser 84 should preferably be in the order of 3 megohms and 1 mfd., respectively. Similarly, the values of resistor 86 and its associated condenser 88 should also be preferably in the order of 3 megohms and 1 mfd., respectively. The load resistor 81*a* may have any suitable value—say, for example, 25,000 ohms.

The various operating potentials for camera tube 28 are determined in accordance with the conditions under which the system is to be operated. However, it has been found that the following voltages are sufficiently approximate to serve as a guide in selecting actual values:

| | Volts |
|---|---|
| Potential on photocathode 30 | {+100, −600} |
| Potential on rotator electrode 34 | −100 |
| Potential on wire mesh screen 38 | +1 to +5 |
| Potential on decelerator electrode 43 | 0 |
| Potential on focus electrode 42 | +50 to +150 |
| Potential on signal plate 56 | +125 to +250 |
| Potential on cathode 40 | 0 |
| Bias on grid 41 | 0 to −25 |

While an arrangement has been described above in which photoelectric emission from the photo-cathode of an "image" type camera tube takes place only during desired intervals, it is possible to achieve the same result by permitting photoelectric emission to occur at all times, and then employ means for preventing these emitted electrons from reaching the mosaic or target electrode during undesired intervals. This might be accomplished, for example, by placing a high positive potential on either the rotator electrode 34 or on some other auxiliary electrode (not shown) in the "image" section of tube 28. The electrons emitted from photo-cathode 30 would then be collected by this highly positive electrode, and none would reach the mosaic 36. During intervals when it is desired to establish a positive charge pattern on mosaic 36, however, the rotator, or other auxiliary electrode, would be at negative potential.

It should be noted that the wire mesh screen 38 cannot be used for the above purpose, however, since it controls the potential to which the mosaic electrode 36 builds up.

I claim:

1. A system comprising a television camera tube having a photo-sensitive electrode, means for successively projecting images successively recorded on an intermittently moving film on to said photo-sensitive electrode in said television camera tube, a target electrode in said camera tube, means for scanning said target electrode with an electron scanning beam, means for generating a varying voltage, means for establishing a predetermined time relationship between the operation of said generating means and the intermittent movement of said film, and means for applying said voltage variation to the photo-sensitive electrode of said camera tube polarized and timed so that the most positive portions of said voltage variation coincide with the periods during which the said target electrode is being scanned by the said electron scanning beam and also include the periods of intermittent movement of said film, the most positive portions of said voltage variation being effective during the periods of their application to prevent electrons flowing from said photo-sensitive electrode to said target electrode.

2. A television system comprising a camera tube having a photo-cathode from which photo-electrons are emitted under the action of impinging light, means for causing the photoelectrons which are thus emitted to impact a mosaic target electrode in said camera tube to thereby set up on said mosaic target electrode a series of discrete electrostatic charges, said camera tube also including means for developing an electron beam and for deflecting said beam to scan said mosaic target electrode within a selected scanning period so as to produce output signals from said tube, means for producing a voltage variation during a major portion of the scanning period during which the said mosaic electrode is being scanned by the said electron beam, means for applying the developed voltage variation to said photo-cathode to prevent the effective emission of said photo-electrons therefrom during the selected period, and means for scanning the said mosaic target electrode during the time which the said developed voltage variation applied to said photo-cathode is most positive.

FRANK J. SOMERS.

REFERENCES CITED

The following references are of record in the file of this patent:

UNITED STATES PATENTS

| Number | Name | Date |
| --- | --- | --- |
| 2,237,896 | Vance | Apr. 8, 1941 |
| 2,275,898 | Goldsmith | Mar. 10, 1942 |

FOREIGN PATENTS

| Number | Country | Date |
| --- | --- | --- |
| 490,391 | Great Britain | Aug. 15, 1938 |
| 526,622 | Great Britain | Sept. 23, 1940 |